INVENTOR
EDWARD A. ROCKWELL by: Wolfe, Hubbard, Voit & Osann
ATTYS.

INVENTOR
EDWARD A. ROCKWELL
by: Wolfe, Hubbard, Voit & Osann
ATTYS

Fig. 9

United States Patent Office 3,421,607
Patented Jan. 14, 1969

3,421,607
DISC BRAKE WITH COMPENSATION, ANTI-SKID CONTROL, AND FAIL-SAFE SYSTEM
Edward A. Rockwell, 167 Ashdale Place,
Los Angeles, Calif. 90049
Original application Mar. 8, 1965, Ser. No. 437,693, now Patent No. 3,326,333, dated June 20, 1967. Divided and this application Mar. 7, 1967, Ser. No. 654,937
U.S. Cl. 188—196   11 Claims
Int. Cl. F16d 65/38; B60t 11/10

ABSTRACT OF THE DISCLOSURE

A vehicle braking system including a pair of parallel master cylinders having independent fluid reservoirs connected to a pair of slave cylinders at each wheel through dual hydraulic lines. A single foot pedal is used for both service brake and parking brake applications, with a latching mechanism cooperating with the foot pedal to hold it in a latched position for the parking brake application. The latch can be released only by advancing the pedal slightly beyond the latched position, so that the brakes must be applied at the time that the parking brake is released. The dual slave cylinders at each wheel include a compensating mechanism which automatically reduces the fluid requirements of the wheel cylinders and pistons in response to increase fluid pressure in the hydraulic system. The brake mechanism also includes an anti-skid device which varies the brake effectiveness in response to an inertial control mass. A disc brake arrangement is also provided in which at least one of the braking surfaces is provided by a series of circumferentially spaced brake pads which permit cooling air to circulate therebetween, and are also radially movable for cooperation with the inertial control mass of the anti-skid mechanism.

This invention relates generally to vehicle braking systems including brake mechanisms for a rotary member and, more particularly, to a disc type of brake for a rotary wheel. This invention has particular but by no means exclusive utility in brakes for automobiles, aircraft, trucks buses, tractors, etc. where braking service is severe.

This application is a divisional of my copending application Ser. No. 437,693, filed Mar. 8, 1965, now Patent No. 3,326,333.

It is a primary object of the present invention to provide an improved vehicle braking system including dual hydraulic systems in which both systems are operative during both service and parking brake applications. In this connection, it is an object to provide such a system which enables reduction in the fluid pressure and/or the cylinder sizes in each of the dual hydraulic systems.

It is a further object of the invention to provide an improved vehicle braking system of the above type in which the two hydraulic systems operate independently of each other but with equal displacements so that failure of one system does not affect operation of the other, and in which one of the hydraulic systems alone is capable of applying substantially the same braking force to the vehicle wheels, but at substantially twice the unit pressure. A related object is to provide such a system which effectively eliminates the need for separate emergency pedal or handle by providing a corresponding safety factor in the hydraulic actuating system. Another related object is to provide such a system in which the safety factor is applicable to parking brakes as well as service brakes.

It is another object of the invention to provide an improved vehicle braking system of the foregoing type which enables both service and parking brake operation hydraulically by means of a single foot pedal. One particular object is to provide such a system which automatically indicates when there has been a failure in one of the dual hydraulic systems.

Still another object is to provide such an improved braking system which provides an improved safety factor by requiring the operator to have the brake applied before releasing the same for a parking brake application.

It is a further important object of the present invention to automatically compensate for the additional fluid requirements attendant the displacement losses due to increased braking in a hydraulic brake system. More particularly, it is an object to provide an improved disc brake having a hydraulic actuating system including a brake cylinder and piston in which the increased fluid requirements of the hydraulic system due to deflections in the lines, seals, and brake elements at increased fluid pressures are compensated by reducing the fluid requirements of the cylinder and piston in accordance with increases in the fluid pressure.

Still another object of the invention is to provide an improved vehicle braking system having a dual hydraulic system including dual slave cylinders at each wheel and in which the increased fluid requirements due to deflection losses in the two systems are commonly compensated by a single compensating mechanism at each wheel for reducing the fluid requirements of the dual wheel cylinders and pistons in accordance with increases in the forces applied by the fluid pressure.

It is yet another object to provide an improved disc brake which avoids self-energization of the braking elements and thus avoids the disadvantages normally associated with such brakes. A related object is to provide such a disc brake which is non-self-energizing and is operated by manually applied fluid pressure, without power assist, utilizing the hydraulic ratio of the brake system.

It is another important object of this invention to provide a direct acting skid-prevention device, a part from the manual control means, to vary the brake effectiveness according to the force of a decelerating mass which is normally driven by and with the wheel to be braked so as to have faster application than in prior art devices where the decelerating mass acts indirectly by controlling the fluid pressure. A related object is to provide an improved arrangement of the balanced mass within the brake and carried by the hub of the wheel to be braked.

It is a further important object of this invention to provide an improved brake mechanism of the disc type which is automatically controlled for skid prevention. In this connection, it is an object of the invention to provide a disc brake which reduces the braking energy applied to the rotary brake member according to the deceleration of the rotary member. Consequently, it is an object to provide a brake which tends to insure against loss of steering control under hazardous road conditions.

It is still another object of the present invention to provide a disc brake of the foregoing type with improved air cooling of the surfaces to be cooled. In this connection, it is an object of the invention to provide open areas along the path of engagement of the braking surfaces so that cooling air may be guided directly over the braking surfaces.

A still further object of the invention is to provide an improved disc brake which is better balanced in both the unworn and worn condition due to reduced mass in the rotating elements of the brake. In this connection, it is an object to provide such a brake which will maintain itself balanced throughout the life of the wearable brake elements.

Another object is to provide an improved disc brake which is easier to service to replace the wearable brake elements of the brake structure, thereby reducing maintenance difficulties and cost.

It is a further object of the invention to provide an improved disc brake which is extremely compact and which is adaptable for mounting on the hub portion of the small (fourteen-inch) wheels used on modern motor cars. A related object is to provide such a brake mechanism which is constructed to occupy a small annular space totally enclosed within the wheel.

It is also an object of this invention to provide a brake construction which is made up of relatively few parts which are suitable for manufacture in quantity at a relatively low cost.

Other objects and advantages will become apparent upon reading the attached description and upon reference to the drawings, in which.

While the invention is susceptible of various modifications and alternative constructions, an illustrative embodiment has been shown in the drawings and will be described below in considerable detail. It should be understood, however, that there is no intention to limit the invention to the specific form disclosed but, on the contrary, the intention is to cover all modifications, alternative constructions and equivalents falling within the spirit and scope of the invention as expressed in the appended claims.

Turning now to the drawings, a brake embodying the present invention has been shown applied to the left front wheel of an automobile. The front wheel spindle indicated at 10 is integral with the steering knuckle 11 which is adapted for mounting on the automobile front suspension arm in the usual way. Surrounding the spindle 10 is a hub indicated generally at 12 journaled on suitable front wheel bearings 13, 14. The face 15 of the hub flange 15a is substantially flat and is provided with a locating boss 16 for centered mounting of a wheel 17. The wheel comprises a wall 18 on which a rim 20 is secured by electrical welds spaced circumferentially. A plurality of circumferentially spaced holes are formed in the wall 18 so that the wheel 17 may be fastened to the locating boss 16 on the hub by a circle of nuts 19 threaded on studs 21. The wheel structure provides an annular cavity totally contained within the confines of the wheel rim and the wall 18. The present brake mechanism is constructed not only to provide maximum efficiency, but is also of such a configuration as to be conveniently housed within the annular cavity.

As in most conventional disc brake mechanisms, the disc brake of this invention includes a pair of opposed braking surfaces lying in generally parallel planes normal to the axis of rotation with one of the braking surfaces being rotatable with the wheel and the other braking surface being fixed against rotation with the wheel. At least one of the opposed braking surfaces is mounted for axial movement into frictional engagement with the other surface to produce a braking force, and a hydraulic actuating means is provided for advancing the axially movable braking surface into frictional engagement with the other surface.

In accordance with one important aspect of the present invention, one of the opposed braking surfaces is provided by a plurality of brake elements which are circumferentially spaced so as to provide open areas within the plane of that braking surface. These open areas substantially increase the ability of the brake mechanism to dissipate heat generated during operation of the braking members and also enable the brake elements to be manipulated to prevent skidding of the wheel while the braking force is being applied, as described in more detail hereinafter. Thus, in the illustrative embodiment shown in the drawings, rotational braking surfaces are provided by a plurality of circumferentially spaced brake pads or pucks 30 mounted on the wheel hub 12 by means of an annular mounting plate 31 which rotates with the wheel 17. The mounting plate 31 is fastened to the wheel 17 by means of the mounting studs 21 passing through an inner flange portion 32 of the mounting plate and securely riveted to the flange 15a resting against the face 15 and centered by the hub boss 16. Each of the five illustrative brake pads 30 is of generally cylindrical shape so as to form a pair of generally parallel rotational braking surfaces 33 and 34. The pads 30 are equally spaced around the circumference of the hub with the respective braking surfaces 33 and 34 of the pads lying in common planes normal to the axis of the spindle. It will be appreciated that the size and number of the brake pads 30 may be varied as long as sufficient open area is provided between each pair of adjacent pads to achieve the required degree of cooling and, as explained in more detail below, to permit radial movement of the brake pads. The pads 30 may be made of conventional brake lining material of the type suitable for high unit pressures such as used in caliper type brakes.

Since the circumferentially spaced brake pads 30 have a relatively small mass, as compared with conventional disc brake lining assemblies for example, and since the relatively heavy discs which cooperate with the pads 30 do not rotate, the wheel has better balance. Moreover, the wear on the rotating braking surfaces is concentrated at a small number of equally spaced points, so that the rotating braking surfaces tend to wear uniformly around the circumference of the circle. Consequently, the brake mechanism maintains itself in balanced condition throughout the life of the wearable brake elements.

Figure 2:
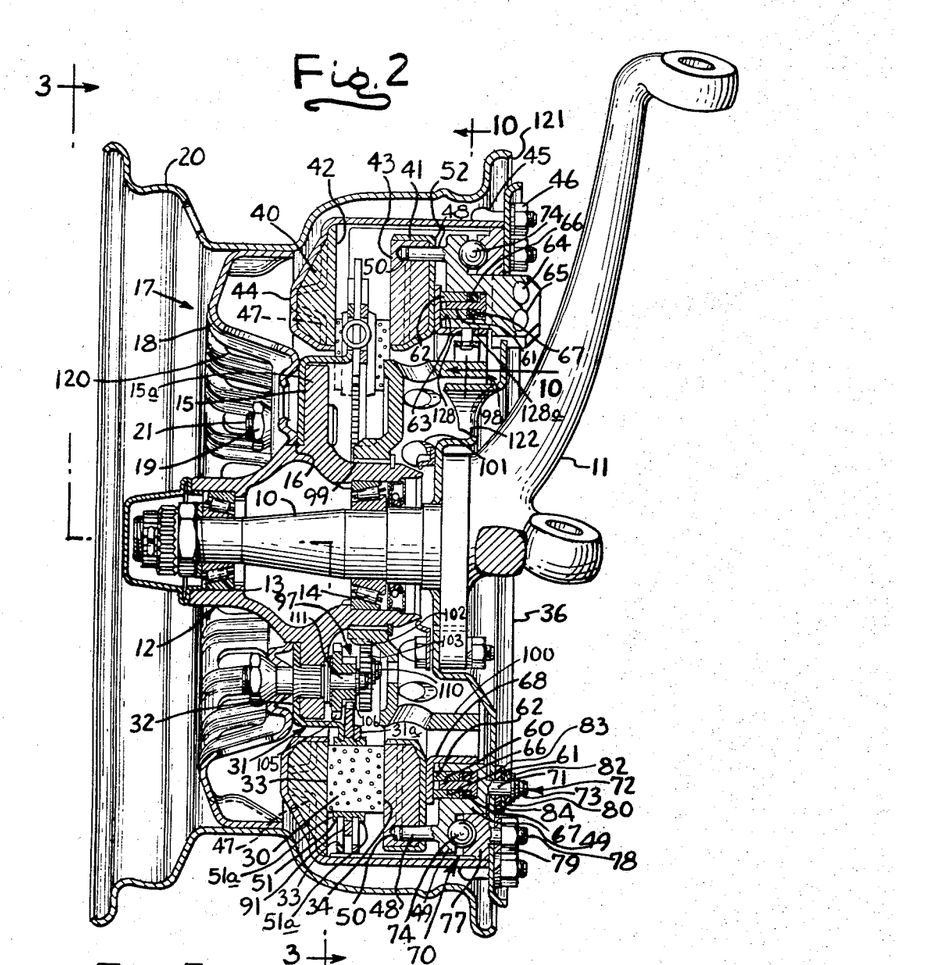
FIG. 2 is a vertical section of the wheel and brake shown in FIGURE 1 taken substantially in the plane of line 2—2 of FIGURE 1.

As shown most clearly in FIG. 2, the circular assembly of brake pads 30 is straddled by a pair of brake discs 40 and 41 which are fixed against rotation with the wheel. These discs 40 and 41 form a pair of braking surfaces 42 and 43, respectively, which cooperate with the opposed rotational braking surfaces 33 and 34. The outer brake disc 40 is integrally cast within an annular frame 44 which is secured to the backing plate 36 by means of integral lugs 45 extending through the backing plate and secured thereto by nuts 46. To facilitate cooling of the disc 40, a plurality of recesses 47 are formed in the outer surface of the annular frame 44.

Figure 4:
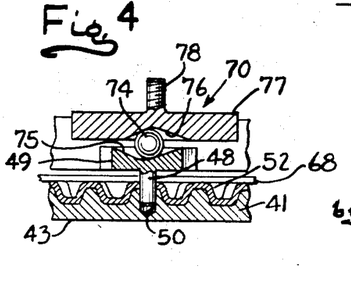
FIG. 4 is a fragmentary section taken along the line 4—4 of FIG. 1 to show the camming device utilized in the compensating mechanism.

For the purpose of supporting and positioning the inner brake disc 41, a plurality of guide rods 48 projects forwardly from an annular casing 49 into corresponding cylindrical bores 50 formed in the inner surface of the disc 41. The casing 49 is secured to the backing plate 36 so that the guide rods 48 fix the disc 41 against rotation with the wheel while permitting axial movement of the disc into frictional engagement with the surfaces 34 of the brake pads 30. To facilitate cooling of the inner disc 41, the inner surfaces of the disc 41 and its supporting frame 52 are fluted, as shown in FIG. 4, to provide a series of radial grooves through which cooling air may be circulated.

In accordance with one feature of the invention, the brake pads 30 are mounted for axial movement within their supporting assembly so that the pads may be displaced toward the stationary disc 40 by the axially movable disc 41 so that said axial forces are transmitted independently through each of the pads 30 to the opposed discs 40 and 41. Thus, the pads 30 are mounted in the supporting plate 31 by means of small sleeves 51 provided with small spun-over retaining flanges 51a and having smooth inner surfaces to permit free axial movement of the pads 30. The flanges 51a define peripheral grooves, and one of the grooves on each sleeve fits over the edge of the mounting plate 31 to prevent axial movement of the sleeves 51. As the disc 41 is advanced against the brake pads 30, it forces the pads axially against the opposed surface 42 of the outer disc 40 so that the braking force is produced by frictional engagement between two pairs of opposed braking surfaces, i.e., between surfaces 42 and 33 and surfaces 43 and 34. It will be recognized that the axial movement of the pads within the sleeves 51 is limited only by the brake discs 40 and 41 and, consequently, the pads are readily accessible simply by removing one of the discs 40 or 41. When one of the discs is removed, the pads 30 may be easily withdrawn from their supporting sleeves 51 and replaced with new pads which are simply inserted into the empty sleeves 51. Servicing of the brake is, therefore, extremely rapid and simple.

For the purpose of moving the brake disc 41 axially to actuate the brake mechanism, dual annular hydraulic cylinders 60 and 61 are formed in the casing 49 for receiving dual annular hydraulic pistons 62 and 63. Hydraulic fluid is supplied to the two cylinders 60 and 61 through dual ports 64, 65 connected to a pair of hydraulic lines, and a pair of corresponding bleed screws 64a, 65a are placed so as to be accessible behind the wheel 17. Resilient O-rings 66, 67 are provided within the cylinders to seal the assembly against the escape of hydraulic fluid. A preferred dual hydraulic system for actuating the dual wheel cylinders 60, 61 will be described in more detail hereinafter.

As the pistons 62, 63 are advanced by the hydraulic fluid within the cylinders 60, 61, axial forces are transmitted to the disc 41 via an annular ring 68 of L-shaped cross-section which rides along the inner surface of the annular casing 49. The advancing disc 41 engages the rotating pads 30 and urges them axially against the outer disc member 40 so that the pads are effectively clamped between the opposed surfaces 42 and 43 of the two discs, thereby producing the required braking force according to the fluid pressure on the pistons.

It will be apparent from the description thus far that the braking force is produced solely by manually applied fluid pressure, without power assist, utilizing the hydraulic ratio of the brake system. One of the problems in a brake of this type is that the volume of the hydraulic system expands with increasing fluid pressure due to deflections of the lines, seals, and brake elements, thereby substantially increasing the fluid requirements to be met by the master cylinder. Moreover, the fluid requirements are further increased by the greater piston displacements required in the wheel cylinders as wear reduces the thickness of the wearable brake elements. This increase in the amount of fluid required is not very large for each wheel, but considering that any increase is multiplied by the four wheels, the net result is a substantial addition to the overall fluid requirements of the actuating system.

In accordance with the present invention, both the cylinder and piston members of the hydraulic actuator are mounted for axial movement, and a compensating device is provided for automatically advancing the cylinder toward the piston according to the fluid pressure so as to reduce the fluid requirements of the cylinder to compensate for increases in the fluid pressure in the system. Thus, in the illustrative embodiment, the casing 49 which forms the wheel cylinders 60, 61 is mounted for axial movement by means of a plurality of axial studs 71 extending through corresponding openings in the backing plate 36. To permit limited axial movement of the casing 49 by sliding of the studs 71 through the backing plate 36, each stud 71 is secured to the plate 36 by means of a Belleville spring assembly 72 and snap ring 73. As described in more detail below, the spring assembly 72 also serves to return the casing 49 toward the backing plate 36 as the fluid pressure in the hydraulic cylinders decreases.

Automatic adjustment of the axial position of the cylinders 60, 61 is effected by a camming device 70 which is responsive to the braking force produced by the engaging brake surfaces. The camming device 70 advances the cylinders 60, 61 toward the pistons 62, 63 with increasing braking force, thereby reducing the fluid requirements of the cylinders 60, 61 to compensate for increases in the fluid pressure. This, in effect, makes additional fluid available to compensate for the expanded volume of the hydraulic system due to deflections of the lines, seals, and brake elements produced by the high fluid pressures.

For the purpose of transmitting the braking force to the camming device 70, the brake disk 41 and the casing 49 are mounted for limited rotational movement in accordance with the drag on the face of the disc 41 due to frictional engagement with the brake pads 30. The camming device 70, in turn, converts the rotational movement of the casing 49 into corresponding axial movement of the casing 49 so that the cylinders formed thereby are advanced according to the magnitude of the braking force and, therefore, according to the increasing fluid pressure producing the braking force. To permit rotational movement of the casing 40, the openings which are formed in the backing plate 36 to receive the mounting studs 71 are of arcuate shape, as illustrated at 71a in FIG. 1, so that the studs 71 are free to move through a small angular distance within the plate 36. Consequently, when braking engagement is caused between the disc 41 and the rotating pads 30, the resulting drag on the disc 41 produces limited rotational movement of both the disc 41 and the casing 49, via the rods 48, thereby actuating the camming device 70 in accordance with the magnitude of the braking force.

In order to convert the limited rotational movement of the disc 41 and the casing 49 into linear displacement of the cylinders 60 and 61, the camming device 70 comprises a plurality of balls 74 seated between pairs of V-ramps 75 and 76. One of the V-ramps 75 associated with each ball 74 is formed in the casing 49, while the opposed V-ramps 76 is formed in a stationary member 77 attached to the braking plate 36 by studs 78 and nuts 79. Thus, the rotary movement of the casing 49 rolls the balls 74 up the V-ramps, in forward or reverse direction of the wheels, as shown in FIG. 4 for example, thereby forcing the casing 49 away from the rigid members 77. Since the cylinders 60, 61 are formed as integral parts of the casing 49, they are advanced along with the casing toward the pistons 62, 63 to compensate for the additional fluid requirements due to displacement losses attendant increased fluid pressure in the system.

It will be appreciated that since the axial displacement of the cylinders 60, 61 relative to the pistons is a function of the braking force transmitted to the camming device 70, and since the braking force is a function of the fluid pressure in the cylinders, the fluid requirements of the cylinders 60, 61 will be progressively reduced as the fluid pressure increases. Thus, it can be seen that the axial displacement of the cylinders toward the pistons continually compensates for the additional fluid requirements due to increasing fluid pressure. This same effect could be achieved by reversing the functions of the cylinder and piston members of the hydraulic actuator as long as both members are mounted for axial movement and a suitable compensating mechanism is provided to advance the member which is not used to apply the brakes toward the other member in accordance with increases in the fluid pressure. In this connection, it should also be noted that it is not essential that the braking force for actuating the compensating mechanism be derived from the axially movable brake disc which applies the brakes. For example, in the particular device illustrated, the rotational force for actuating the camming device 70 could be derived from the brake disc 40 rather than the axially movable disc 41.

Figure 1:
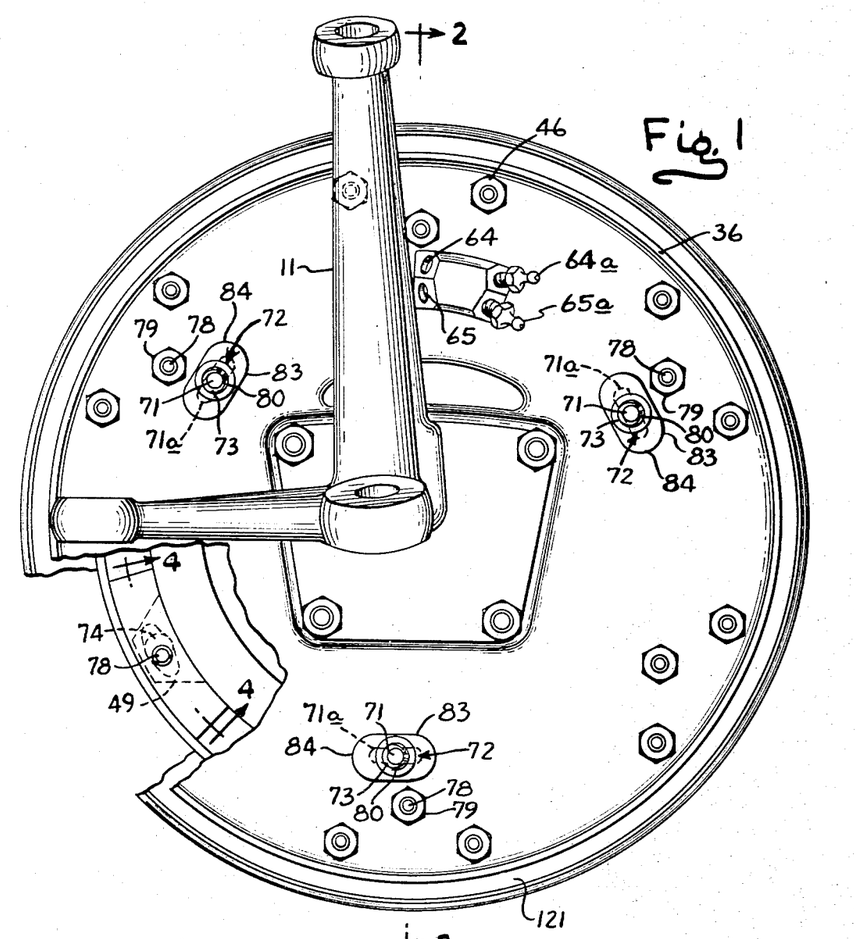
FIGURE 1 is a view in elevation of the inner side of a left front automobile wheel with a brake embodying the present invention mounted thereon, with a fragment of the wheel being broken away to show the internal brake mechanism.

For the purpose of returning the casing 49 to its normal position adjacent the backing plate 36 when the brakes are released by the vehicle operator, the Belleville spring assembly 72 mounted on each casing stud 71 is adapted to constantly oppose the axial force applied by the camming device 70 and thus urge the casing 49 back toward the plate 36. As can be seen in FIGS. 1 and 2, each spring assembly 72 comprises a Belleville washer or spring 80 mounted between a pair of washers 82 and 83. The assembly is held in place by a snap ring 73 fastened onto the end of the stud 71. The Belleville spring 80 exhibits nonproportional deflection under load as compared with the usual characteristic of springs to exhibit proportional deflection under load. To prevent the spring assembly from catching on the edges of the arcuate slot in the backing plate 36 as the studs 71 are moved rotationally therethrough, the entire spring assembly is mounted on an elongated washer 84 which overlaps the edges of the arcuate slot at all angular positions of the stud 71, as can be seen from FIG. 1. The washer 84 fits snugly around a square section of the stud 71 and, therefore, slides over the surface of the plate 36 according to the angular movement of the stud 71. The washer 84 may be made of a material having a low friction coefficient such as some of the well known plastic materials.

To prevent any self-energization of the brakes, and thus to prevent the brakes from locking due to pyramiding of the force of self-energization, the camming angle of the V-ramps 75 and 76 is selected so as to avoid any self-energizing effect. More particularly, the equivalent friction angle of the braking surfaces (due to coefficient of friction) should always be equal to the camming angle of the V-ramps, when taking into account the opposing springs 80, i.e., the force of deflection being equal to the force produced by the difference between the said equivalent angles. In short, the deflection characteristic is based on the coefficient of friction of the brake pads on one side and the rate of the springs which can be preferably selected to closely follow the displacement losses. Thus, the Belleville spring assemblies act as calibrating means for controlling the automatic adjustments of the hydraulic cylinders and piston in accordance with the displacement losses in the hydraulic system due to the increases in fluid pressure therein.

In accordance with another important aspect of the present invention, there is provided an anti-skid mechanism which moves the area of engagement of the braking surfaces radially inwardly toward the wheel hub according to increasing deceleration of the wheel so as to reduce the braking force on the wheel at relatively high wheel deceleration and thereby reduce the tendency of the wheel to skid. Thus, in the illustrative embodiment, the mounting mounting plate 31 for the circumferentially spaced brake pads 30 is provided with radially extending guide slots 90 to permit radial movement of the pads 30. The pads 30 are carried along the radial slots 90 by the peripherally grooved mounting sleeves 51 riding on the edges of the slots. In order to maintain the braking force as the pads are moved along their radial paths, the discs 40 and 41 must have a radial width at least as great as the radial length of the slots 90, as shown in FIG. 2.

For the purpose of sliding the sleeves 51 and the pads 30 along the radial slots 90, a camming ring 91 is mounted adjacent the plate 31 with radially projecting areas 92 on the ring defining slots 93 for receiving the sleeves 51. The grooved sleeves 51 ride along the edges of the slots 93 in slight overlapping relationship therewith. The opposed edges 94 and 95 of the slots 93 extend across the guide slots 90 at a predetermined angle such that rotational movement of the camming ring 91 relative to the plate 31 causes the slot edges 94 and 95 to act as camming surfaces to move the sleeves 51 and pads 30 along the respective radial guide slots 90. To enable the camming surfaces 94 and 95 to move the pads 30 along the full length of the slots 90, the radial length of the slots 93 should be at least as great as that of the guide slots 90.

Figures 3, 6:
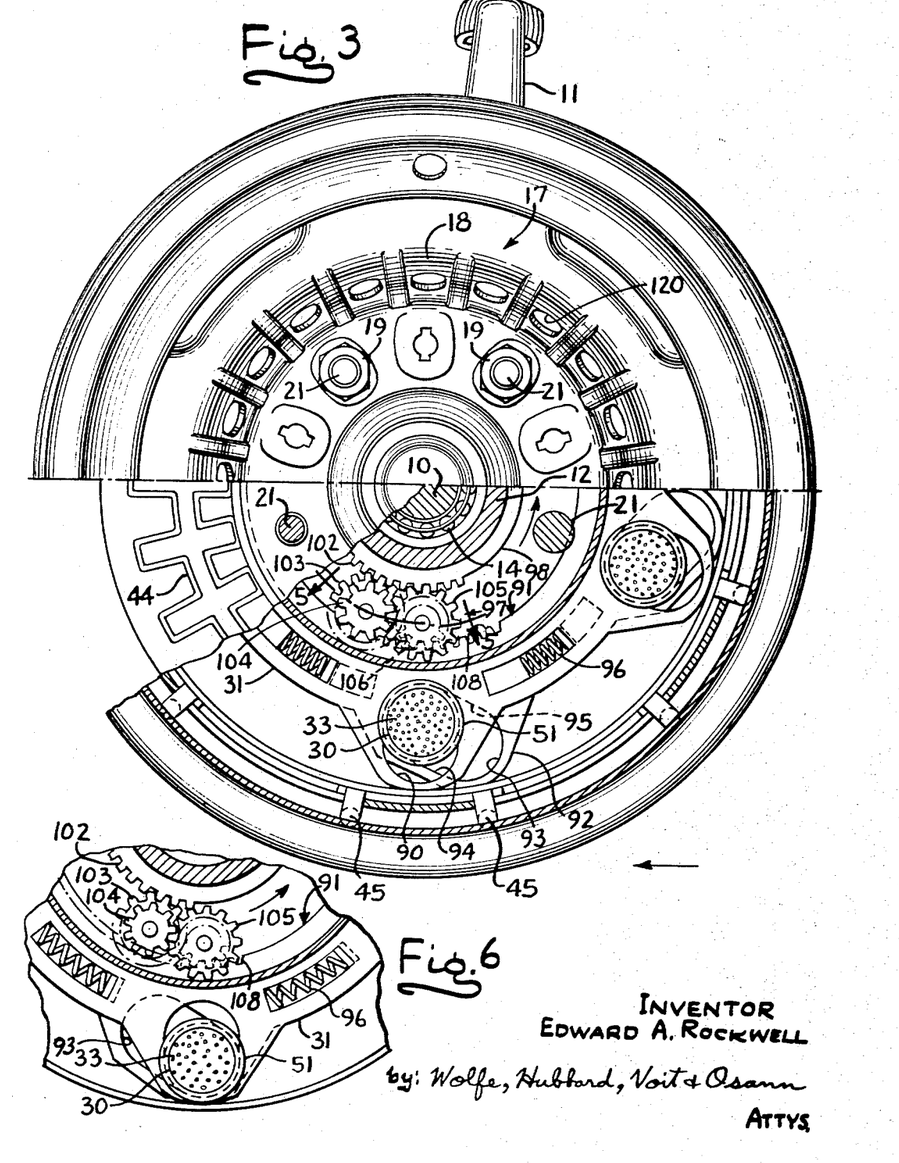
FIG. 3 is a view in elevation of the outer side wall of the wheel of FIGURE 1 with a fragment broken away along line 3—3 of FIG. 2.
FIG. 6 is a fragmentary elevation corresponding to the lower portion of FIG. 3 but with the braking elements in a different position.

The camming action of the ring 91 is illustrated most clearly in FIGS. 3 and 6. In FIG. 3, the brake pads 30 have been moved to their radially innermost positions by rotation of the camming ring 91 in a counterclockwise direction. In other words, the cam surfaces 94 force the pads 30 radially inwardly along the slots 90 until the sleeves 51 abut the inner ends of the slots 90. In FIG. 6, the camming ring 91 has been rotated in a clockwise direction relative to the plate 31 so as to cause the cam surface 95 to move the pads 30 to their radially outermost positions with the sleeves 51 abutting the outer ends of the guide slots 90.

During normal rotation of the wheel 17, the brake pads 30 remain in their radially outermost positions (FIG. 6) due to the biasing action of circumferentially spaced springs 96 urging the camming ring 91 in a clockwise direction. Rotational movement of the camming ring 91 in a counterclockwise direction, against the biasing force of the spring 96, is controlled by a gear train 97 which in turn is controlled by a relatively massive inertial control ring 98. The inertial control ring 98 is mounted on a bushing 99 on the outer surface of the hub 12 so that the ring 98 is free to rotate relative to the wheel. A relatively large axial flange 100 is formed on the periphery of the ring to increase its inertial force, with a circular array of holes 101 being provided in the flange 100 for passing and directing cooling air therethrough.

Figure 5:
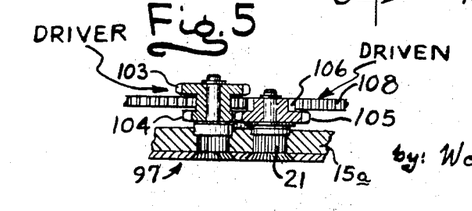
FIG. 5 is a fragmentary section taken along line 5—5 of FIG. 3 to show the gear train therein.

A driving connection between the inertial control ring 98 and the camming ring 91 is provided by the gear train 97. Referring particularly to FIGS. 3 and 5, if the control ring 98 is rotated counterclockwise, the gear teeth 102 turn gears 103 and 104 clockwise, to that gear 104 turns gears 105 and 106 counterclockwise and, finally, gear 106 drives the camming ring 91 via teeth 108 in the same direction as the control ring 98. According to the present invention, the gear train 97 functions not only as a driving connection between the control ring 98 and the camming ring 91, but also to amplify the inertial force of the relatively massive control ring 98. Thus, gear 104 is smaller than gear 103, and gear 106 is smaller than gear 105, so that the force applied to the camming ring 91 by the gear 106 is considerably greater than the inertial force applied to the gear 103 by the control ring 98.

It is significant to note that the gears 103 through 106 are mounted on the wheel hub 12, as can be seen in FIG. 2, so that the gears are all carried by the wheel. Thus, gears 103, 104 are mounted on a stub axle 110 fastened to the hub boss 16, while the gears 105, 106 are mounted on a similar stub axle 111 also fastened to the hub boss. With this arrangement the gears can rotate only if both the camming ring 91 and the control ring 98 are able to rotate relative to the wheel. Preferably for balance this gear train can be duplicated at symmetrically spaced points around the center axis.

In operation, acceleration of the wheel 17 (counterclockwise) and the plate 31 mounted thereon drives the brake pads 30 to the leading ends of the slots 93, thereby camming the pads 30 to their outermost positions (FIG. 6). This action is assisted by the biasing springs 96 which are adapted to hold the camming ring 91 in this position relative to the mounting plate 31. After the initial limited rotational advance of the plate 31 relative to the camming ring 91, the sleeves 51 and pads 30 bearing against the leading edge of the slots 93 cause the camming ring to rotate along with the wheel. It should be noted that the gears 103 through 106 are also initially advanced relative to the camming ring 91 since all these gears are mounted on the wheel hub. During this initial movement, the gears roll along the teeth 108 on the inner periphery of the ring 91, but after the camming ring 91 begins to rotate with the wheel there is no longer any movement of the gears 103–106 relative to the camming ring 91. Consequently, the gears are locked against rotation in the reverse direction and, therefore, serve as a rigid connection between the camming ring 91 and the control ring 98. Thus, the control ring 98 also rotates along with the wheel.

As the brakes are applied and the wheel decelerates, the inertial control ring 98 is not subjected to any direct braking forces and therefore, tends to continue to rotate at a speed faster than the decelerating wheel. However, since the gears 103–106 are mounted on the wheel and thus are decelerating along with the wheel, the control member can advance relative to the wheel only if it can also drive the camming ring 91, via the gears 103–106, ahead of the wheel. To do this, the inertial control member must overcome the biasing force of the springs 96, centrifugal force tending to hold the brake pads in their outermost positions, frictional forces due to the engagement of the camming surfaces 94 against the sleeves 51, and any other opposing forces. Thus, it can be seen that the inertial control ring 98, the amplifying gear train 97, the angle of the camming surfaces 94 and 95, and the other associated control elements are designed so that the camming ring 91 is advanced relative to the wheel only when the wheel deceleration is sufficiently high that there is a danger of the wheel locking and skidding.

As the camming ring 91 is advanced relative to the wheel under the potentially skid-producing deceleration conditions, the brake pads 30 are cammed radially inwardly along the slots 33 against the angle of camming surface 94. This reduces the radius of the applied braking force, thus reducing the braking torque on the wheel and thereby reducing the tendency of the wheel to lock and skid. As a result, all the dangers attendant a skidding condition, including loss of steering control by the vehicle operator, are considerably reduced. In the different wheels the slots 33 defining the camming surface 94 are all oriented inwardly and toward the forward direction of motion of the vehicle which provides more effective actuation than would be achieved if the slots 33 were for camming in the other direction due to the natural tendency for the pads 30 to rotate counterclockwise.

For the purpose of cooling the brake mechanism within the annular cavity formed by the wheel structure, the outside wall 18 of the wheel is provided with a series of openings 120 to allow cooling air to be drawn through the wheel to assure long life of the brake pads 30. As the air is drawn into the wheel through the openings 120, a portion thereof passes through the annular passageway between the mounting bracket 44 and the wheel rim 20 and is exhausted through an annular outlet 121 extending around the inner periphery of the wheel. Another stream of the incoming cooling air passes along the inner periphery of the mounting bracket 44 and through the open areas between the brake pads 30, thereby coming into direct contact with the brake surfaces on the two discs 40 and 41. A second portion of air is circulated radially and outwardly through the radial grooves formed by the fluting in the rear surface of disc 41. This inner stream of air enters through the openings 101 in the inertial control ring 98, which acts similar to a centrifugal blower, and augments the entry of air through opening 122 formed in the brake backing plate 36. Also the revolving assembly 31 acts to augment the flow of air between the surfaces 42 and 43. It should be noted that this cooling system is extremely efficient since it brings the cooling air into direct contact with those surfaces which actually generate the heat within the brake mechanism.

In another aspect of the invention, there is provided an automatic adjustment means for both wheel cylinders. Thus, referring to FIGURES 2 and 10, there is shown one of three equally spaced assemblies including a flat spring arm 124 which is formed to be mounted on a pin 125 secured to the ring 68 and extending inwardly therefrom. The arm 124, which is free to swivel about the pin 125, extends circumferentially away from the pin 125 and is attached at its outermost end to a friction stud 127. The friction stud 127 extends through an axial slot 128 in the ring 68 into frictional engagement with the inner surface 49a of the cylinder casing 49. Mounted on the inner end of the pin 125 is a coiled spring 123 having extending arms 123a and 123b. The one extending arm 123a is anchored in a hole 126 in the ring 68, while the other arm 123b is anchored by the spring arm 124, so that the entire assembly tends to follow the axial movements of the ring 68.

Thus, as the pistons 62, 63 are advanced, they advance the ring 28 axially against the brake disc 41. Initially, this axial displacement of the ring 68 moves the entire adjustment assembly mounted on the pin 125, with the exception of the end portion of the arm 124 which tends to remain stationary because of the frictional engagement of the stud 127 against the cylinder casing 49. Consequently, the arm 124 swivels in the axial direction, resisting the advance of the pistons 62, 63 and biasing the ring 68 and the pistons 62, 63 back toward their original positions by the torque of the spring 123. After the fluid pressure has been removed from the pistons by the return of the brake pedal, the torque spring action on the arm 124 returns the ring 68 and the pistons 62, 63 to their original positions.

As the brake surfaces gradually become worn, the axial displacement of the ring 68 gradually increases so that the end 128a of the slot 128 abuts the stud 127 and displaces it axially along the surface of the cylinder casing 49. Of course, this displacement of the stud 127 never occurs until the ring 68 has advanced an initial distance equal to the clearance between the stud 127 and the slot end 128a. Thus, it can be seen that this assembly provides an automatic wheel cylinder adjustment that always retracts the pistons 62, 63 the same distance regardless of the degree of wear on the braking surfaces, so that the pistons must always be advanced substantially through the same distance to apply the brakes. In other words, the return assembly itself is continually advanced along the cylinder casing in accordance with the degree of wear on the braking surface, i.e., in accordance with the reduction in axial thickness of the brake elements.

It will be appreciated that the friction holding stud 127 is located between the cylinder casing 49 and member 68. This arrangement differs from previous automatic adjusters which have been controlled by limited action of a friction device for returning and spacing the brake surfaces, inasmuch as the present arrangement will tend to increase the clearance rather than decrease it when there is excessive expansion due to flexibility and heating of the brake parts (if the movement exceeds the set clearance), and will immediately reset the clearance to normal or subsequent normal applications. Consequently, the present arrangement makes feasible less "off" position setting at relatively high application forces. In previous devices the overstressing would diminish the clearance and cause brake drag and would not reset until sufficient wear had taken place. Thus, such devices do not provide a dependable clearance adjuster. Therefore, it should be apparent the desirable result of the combination and cooperation of the said elements of the present invention results in the feasibility of a selected displacement ratio between the pedal and each wheel brake making for relatively high force ratio, which could not be obtained in the prior art arrangements.

Figures 7, 10:
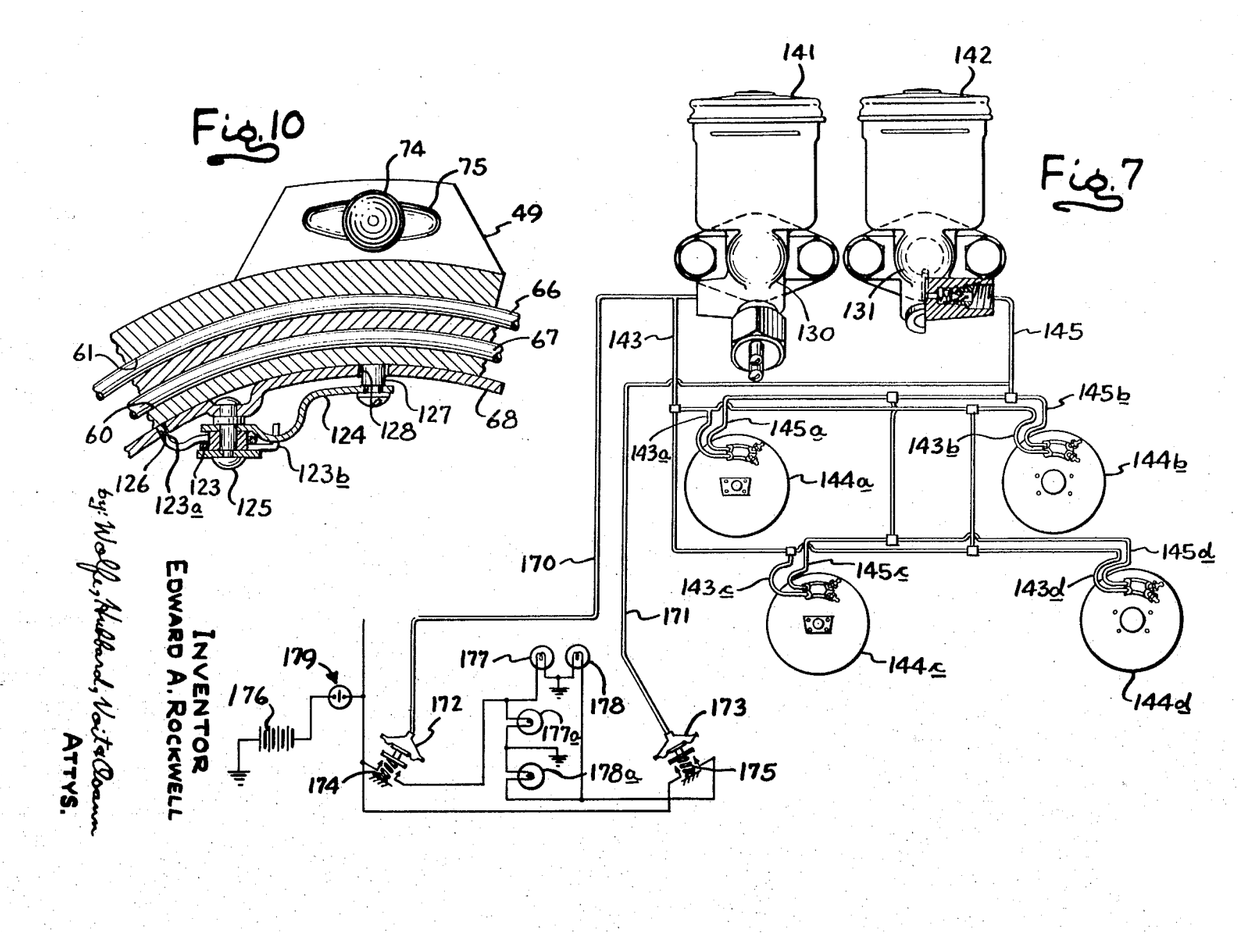
FIG. 7 is a generally schematic diagram illustrating a dual hydraulic brake actuating system embodying the present invention.
FIG. 10 is a fragmentary section taken along 10—10 in FIG. 2 to show the automatic adjustment mechanism for the dual wheel cylinders.
Figure 8:
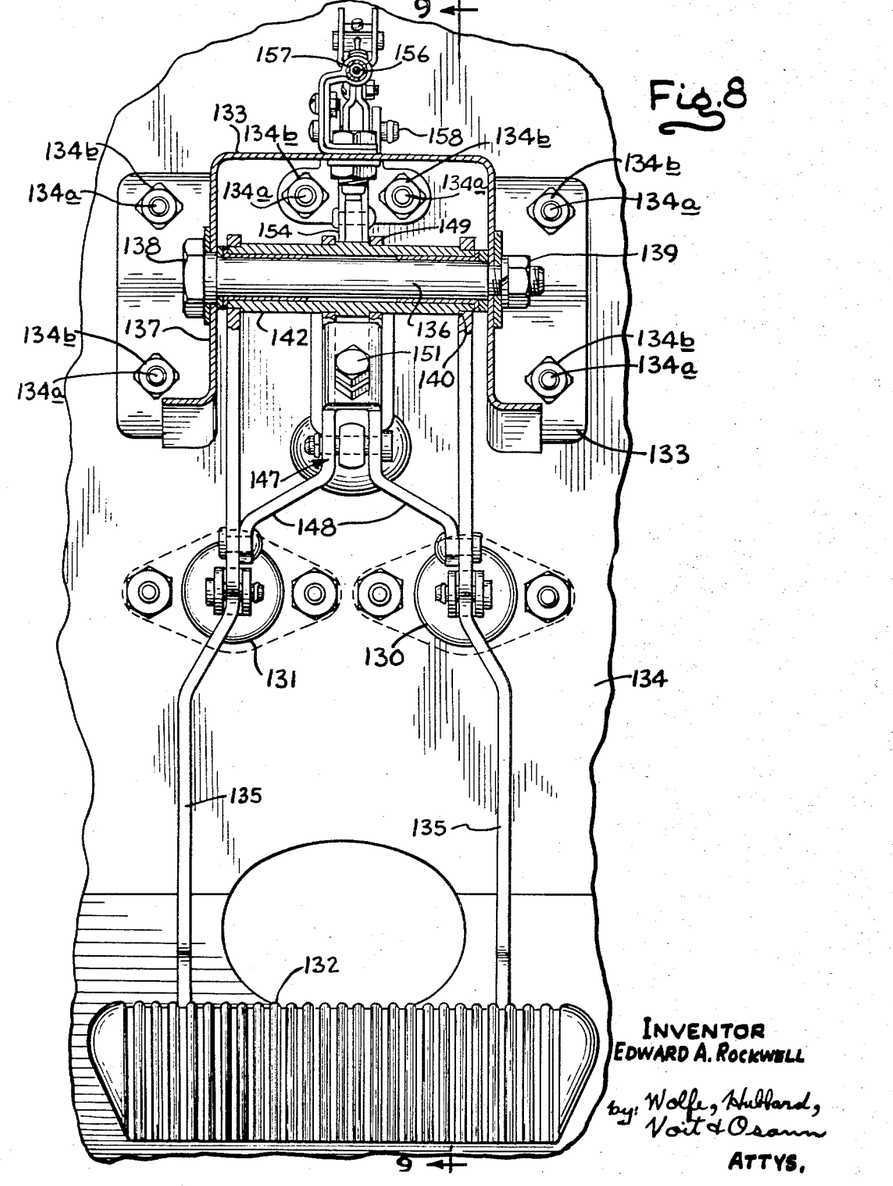
FIG. 8 is a front elevation and section 8—8 of FIG. 9 showing the brake pedal and associated mechanism for actuating the dual hydraulic system for both service and parking brake applications.

In accordance with another important aspect of the present invention, the dual wheel cylinders 60, 61 are actuated by a dual hydraulic system including a pair of independent master cylinders both of which are operated by a single foot pedal and which are connected to the two wheel cylinders through independent hydraulic lines. Thus, referring to FIGURES 7–9, a pair of independent parallel master cylinders 130, 131 are both operated by a single foot pedal 132. The foot pedal 132 is pivotally mounted on a bracket 133 which is fastened to the fire wall 134 by bolts 134a and nuts 134b. The pedal 132 is secured to the lower ends of a pair of supporting arms 135 which are journaled at their upper ends on a shaft 136 so that foot pressure on the pedal 132 causes the arms to swing toward the fire wall 134, as illustrated by the broken lines in FIG. 9. It should be noted that the pedal 132 and arms 135 are arranged to surround the steering post so as to provide a more rigid pedal assembly while at the same time accommodating the steering post. The supporting shaft 136 is rigidly mounted within a channel portion 137 of the bracket 133 by means of a bolt 138 and a nut 139. As can be seen in FIGURE 8, the shaft 136 is provided with shallow peripheral grooves 140 for the purpose of holding the supporting arm 135 in fixed transverse positions.

In order to supply the master cylinders 130, 131 with operating fluid, a pair of independent fluid reservoir tanks 141 and 142 are mounted above the cylinders, and the fluid output of each master cylinder is supplied to a corresponding slave cylinder 60 or 61 at each of the vehicle wheels. Referring particularly to FIGURE 7, the fluid output of the master cylinder 130 is supplied through a main hydraulic supply line 143 and branch lines 143a, 143b, 143c and 143d to a corresponding slave cylinder 60 at each of the four vehicle wheels 144a, 144b, 144c and 144d, respectively. Similarly, the fluid output of the other master cylinder 131 is supplied through a main hydraulic line 145 and branches 145a, 145c and 145d to corresponding slave cylinders 61 at each of the four wheels. Since both of the master cylinders 130, 131 are connected to the same foot pedal 132, it can be seen that both of the hydraulic systems are fully operative at all times, thereby enabling reductions in the fluid pressure and/or the cylinder sizes in both hydraulic systems. Moreover, the concentrically spaced wheel brake actuators are dimensioned to have equal displacements, so that the dual hydraulic system provides an important safety factor since a failure in one of the hydraulic systems, due to leakage of hydraulic fluid for example, does not affect the operation of the other system. In other words, the two hydraulic systems associated with the dual master cylinders 130, 131 are completely independent of each other and, although the two systems are both operative together in parallel during normal usage, the vehicle brakes may be operated by only one of the hydraulic systems in the event of a failure in the other system, in which case the unit pressure in the remaining system will double but will maintain the same hydraulic ratio.

As one specific feature of the invention, the manually operated actuating mechanism associated with the dual master cylinder is adapted to utilize the dual hydraulic system for parking brake applications as well as normal service applications. Thus, a manually operable latching means is provided for holding the brake pedal in the advanced position so that the desired braking forces may be maintained on the vehicle wheels for parking brake uses. Thus, referring to FIGURES 8 and 9, the latching means in the illustrative embodiment comprises a first latching element 146 which is mounted for movement with the brake pedal 132 between retracted and advanced positions. For the purpose of mounting the latching element 146 for movement with the brake pedal, a bracket 147 is journaled on the shaft 136, with two depending legs 148 of the bracket being rigidly secured to the two pedal arms 135. The upper portion of the latching element 146 is pivoted on a rearward projection 149 on the bracket 147, while the lower portion of the element 146 is engaged by a push rod 150 which advances the element 146 along with the pedal. The push rod 150 is preferably threaded through the bracket 147 so that the position of the latching element 146 may be adjusted by turning the exposed head 151 of the rod 150.

Figure 9:
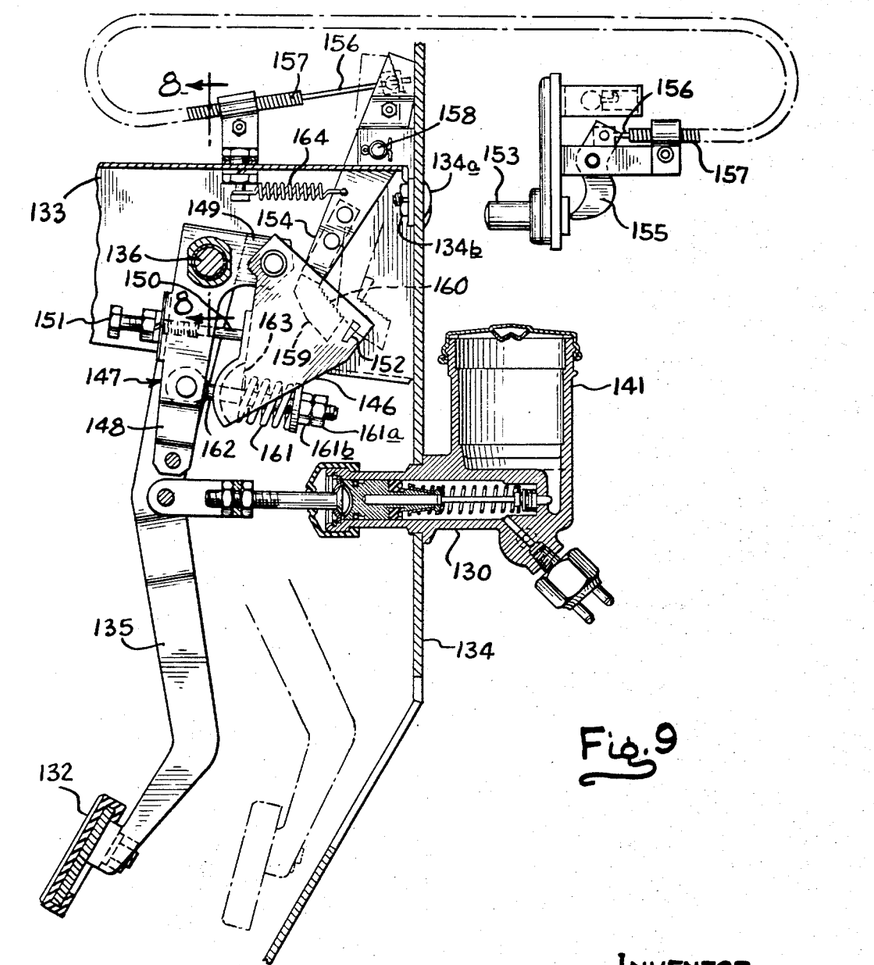
FIG. 9 is a section taken along line 9—9 in FIG. 8.

As the brake pedal 132 is advanced toward the fire wall, the latching element 146 is moved upwardly along a predetermined arcuate path so as to advance a laterally projecting lug 152 on the forward end thereof to a latched position shown by the broken lines in FIGURE 9. During normal service brake operation, the lug 152 simply moves back and forth between the upper and lower positions in accordance with the movement of the brake pedal 132. When it is desired to hold the brake pedal 132 in the advanced position for parking brake applications, a latching button 153, which may be conveniently mounted on the vehicle dashboard, is pressed so as to actuate a second latching element 154 to engage the first latching element 146 and hold it in the upper position, thereby holding the pedal 132 in the advanced position.

As shown in FIGURE 9, the manually operated latching button 153 engages a lever 155 which in turn is connected to a control wire 156 extending through a flexible conduit 157 and connected at the other end to the latching element 154. As the push button 153 is depressed, the lever 155 pulls the control wire 156 through the conduit thereby swinging the latching element 154 about its pivot point 158. Assuming the lug 152 is in the raised position when the push button 153 is depressed, the pivotal movement of the element 154 causes a forward projection 159 on the lower end thereof to swing toward the fire wall so that the lug 152 is engaged by a serrated upper surface 160 on the projection 159, as illustrated in the broken lines in FIGURE 9.

For the purpose of holding the lug 152 firmly down against the serrated surface 160 so that the mechanical latch formed by these two elements cannot be disengaged by a sudden jolt, the latching element 146 is biased rearwardly toward its retracted position by means of a compressed spring 161 mounted on a support rod 162 and bearing against an inner transverse surface 163 at the rearward end of the element 146. This biasing action pulls the lug 152 firmly down against the serrated surface 160 during parking brake applications to resiliently apply pressure to the hydraulic lines and thus compensate for variation due to expansion and contraction in the brake lines while the pedal is latched. This biasing action also serves to insure that the member 146 is always returned to its retracted position along with the pedal 132 during normal service brake operation. The operating force of the spring 161 can be adjusted for the desired holding force by the nut 161a and jam nut 161b.

It will be appreciated that the latching button 153 can operate to apply the parking brakes only when it is pressed while the brake pedal 132 is in its advanced position. If the button 153 is pressed while the pedal 132 is in its normal or retracted position, the projection 159 on the latching element 154 will simply butt against the lug 152 so that it will be impossible for the operator to fully depress the button 153.

To release the parking brake, the brake pedal 132 is advanced slightly so as to raise the lug 152 just clear of the serrated surface 160, and the biasing action of a tension spring 164 then withdraws the latching member 154 to its normal retracted position. As the member 154 is retracted, it pulls the control wire 156 through the flexible conduit 157, thereby pivoting the lever 155 and returning the button 153 to its normal position illustrated in FIGURE 9. The latching element 154 is instantly retracted, merely by pressing the brake pedal 132 while the car is under control of the operator, the brake only thereafter being released and the member 146 returning to its retracted position with the pedal.

As another feature of the invention, there is provided as automatic indicating device to signal the vehicle operator when there has been a failure in one of the hydraulic systems. Thus, referring to FIG. 7, the hydraulic output of each master cylinder 130, 131 is applied through lines 170 and 171, respectively, to hydraulically controlled switches 172 and 173 which are similar to conventional hydraulic "stop light" switches. The switches 172, 173 are biased to the open positions, as diagrammatically illustrated in FIG. 7, by means of compressed springs 174 and 175 which are adapted to maintain the switches in the open positions as long as residual or atmospheric fluid pressures are maintained in the lines 170, 171, such as in the off position of the pedal. However, in the event of a failure in one of the hydraulic systems, the load on the other system increases with resultant decrease in the fluid pressure in the failing system. The decreased fluid pressure opens the switch 172 or 173 controlled by the failing system, thereby disconnecting a battery 176 from one of a pair of signal lights 177 or 178 which indicates to the operator which hydraulic system has failed. Thus, if a failure occurs in the system feeding line 170, the fluid pressure increases in line 171, which will continue to maintain switch 173 on and thereby continue to activate stop light 178a and signal 178 while lights 177 and 177a are cut off by the decrease in pressure in the line 170. Similarly, if a failure occurs in the system feeding line 171, the fluid pressure increases in line 170 so that lights 177 and 177a remain on, while the decrease in pressure in line 171 cuts off lights 178 and 178a. The regular stop lights can be arranged if desired for energization by either or both of the switches. In other words, this warning indicating system is part of the necessary stop light system, and the lights 177a and 177b are the conventional stop lights located at the rear of a vehicle as required by law. This system, therefore, requires very little added cost, and yet it affords the advantage of warning the operator in advance, before releasing the brake, after the vehicle has been parked for some time, as soon as the ignition switch 179 is turned on. If one light is out, it indicates a slight leak down in the pressure in that system. This warning may be some time before actual failure of that system due to the sensitivity of the system to slight drops in pressure resulting from very small leaks. Thus, the operator can have the system serviced before a complete malfunction.

I claim as my invention:

1. In a vehicle hydraulic brake system having one braking surface mounted for movement into frictional engagement with another surface to produce a braking force, and an actuating means including relatively movable hydraulic cylinder and piston members with one of said members applying the brake by moving the movable braking surface, the improvement comprising a compensating mechanism for positioning the other member toward the brake applying member in response to increased braking force to compensate for greater fluid requirements of the hydraulic system due to displacement losses in the overall brake system, and means for returning said other member to its original position upon release of the braking force.

2. In a vehicle brake having one braking surface mounted for axial movement into frictional engagement with another surface to produce a braking force, and an actuating means including hydraulic cylinder and piston members with one of said members movable by fluid pressure to advance the axially movable braking surface into frictional engagement with the other surface, the improvement comprising a compensating mechanism for automatically adjusting the position of said hydraulic cylinder relatively toward the piston in response to increased braking force to compensate for greater fluid requirements of the system, and means for returning said hydraulic cylinder to its original position upon release of said braking force.

3. In a vehicle brake having one braking surface mounted for axial movement into frictional engagement with another surface to produce a braking force, and an actuating means including hydraulic cylinder and piston members with a first one of said members movable by fluid pressure to advance the axially movable braking surface into frictional engagement with the other surface, the improvement comprising a compensating mechanism for automatically advancing the other of said members relative to the first member in response to increased fluid pressure to reduce the fluid requirements of said actuating means in accordance with increases in the fluid pressure therein to produce increases in said braking force, and means for returning said other member to its original position upon a reduction in said fluid pressure.

4. In a brake mechanism for vehicles or the like having a spindle and a rotary wheel mounted on the spindle, a pair of opposed braking surfaces lying in generally parallel planes normal to the spindle axis, one of said surfaces being mounted for rotation with the wheel and the other surface being fixed against such rotation, at least one of said braking surfaces being mounted for axial movement into frictional engagement with the other surface to produce a braking force, and an actuating means including hydraulic cylinder and piston members with one of said members movable by fluid pressure for advancing the axially movable braking surface into frictional engagement with the other surface, the improvement comprising a compensating mechanism for automatically advancing the other of said members relative to the first member in response to increased fluid pressure to reduce the fluid requirements of said actuating means including means in accordance with increases in the fluid pressure therein, and means for returning said other member to its original position upon a reduction in said fluid pressure.

5. In a brake mechanism for vehicles or the like having a spindle and a rotary wheel mounted on the spindle, a pair of opposed braking surfaces lying in generally parallel planes normal to the spindle axis, one of said surfaces being mounted for rotation with the wheel and the other surface being fixed against such rotation, at least one of said braking surfaces being mounted for axial movement into frictional engagement with the other surface to produce a braking force, and an actuating means including hydraulic cylinder and piston members with one of said members movable by fluid pressure for advancing the axially movable braking surface into frictional engagement with the other surface, the improvement comprising a compensating mechanism including means for translating rotational energy from the frictional engagement of said braking surfaces to linear energy for automatically adjusting the position of the other of said hydraulic members to reduce the fluid requirements of said cylinder and piston in response to increases in the fluid pressure therein, said compensating mechanism including calibrating means for controlling said automatic adjustments of the relative positions of said hydraulic members in accordance with the displacement losses in the hydraulic system due to said increases in the fluid pressure, and means for returning said other members to its original position upon a reduction in said fluid pressure.

6. In a brake mechanism for vehicles or the like having a spindle and a rotary wheel mounted on the spindle, a pair of opposed braking surfaces lying in generally parallel planes normal to the spindle axis, one of said surfaces being mounted for rotation with the wheel and the other surface being fixed against such rotation, at least one of said braking surfaces being mounted for axial movement into frictional engagement with the other surface to produce a braking force, and an actuating means including hydraulic cylinder and piston member with a first one of said members movable by fluid pressure for advancing the axially movable braking surface into frictional engagement with the other surface, the improvement comprising a compensating mechanism having cam means including calibration means so arranged that said braking force moves the other of said members toward the first member in response to increased fluid pressure to reduce the fluid requirements of said actuating means in accordance with calibrated adjusted positions of said other member corresponding to increases in the fluid pressure therein, and means for returning said other member to its original position upon a reduction in said fluid pressure.

7. In a brake mechanism for vehicles or the like having a spindle and a rotary wheel mounted on the spindle, a pair of opposed braking surfaces lying in generally parallel planes normal to the spindle axis, one of said surfaces being mounted for rotation with the wheel and the other surface being fixed against such rotation, at least one of said braking surfaces being mounted for axial movement into frictional engagement with the other surface to produce a braking force, and an actuating means including hydraulic cylinder and piston members with a first one of said members movable by fluid pressure for advancing the axially movable braking surface into frictional engagement with the other surface, the improvement comprising a compensating mechanism having a camming means operably connected between one of said braking surfaces and the other of said hydraulic members for translating the rotational braking force into a linear force applied to said other member for automatically advancing said other member relative to the first member in response to increased braking force to reduce the fluid requirements of the hydraulic actuating means in accordance with increases in the fluid pressure therein, said compensating mechanism including calibrating means for controlling the automatic adjustments in the relative positions of said hydraulic members in accordance with the displacement losses in the hydraulic system due to said increases in the fluid pressure, and means for returning said other member to its original position upon release of the braking force.

8. In a brake mechanism for vehicles or the like having a spindle and a rotary wheel mounted on the spindle, a first braking element mounted for rotation with said wheel and forming at least one rotational braking surface, a second braking element fixed against rotation with said wheel and forming at least one essentially stationary braking surface, said second braking element being mounted for axial movement into frictional engagement with said rotational braking surface to produce a braking force, said second braking element also being mounted for limited and calibrated rotational movement by said braking force, an actuating means including a hydraulic cylinder and piston for advancing said second braking element axially so that said stationary braking surface frictionally engages said rotational braking surface to produce said braking force, a compensating mechanism including a camming assembly responsive to said limited rotational movement of said second braking element for urging said cylinder in the direction of piston advance to reduce the fluid requirements of said cylinder in accordance with increases in the fluid pressure in the hydraulic system, said compensating mechanism including calibrating means for controlling the force applied by said camming assembly to said cylinder in accordance with the displacement losses in the hydraulic system due to said increases in the fluid pressure, said calibrating means also returning said cylinder to its return position upon release of said braking force.

9. In a vehicle brake having one braking surface mounted for axial movement into frictional engagement with another surface to produce a braking force, and an actuating means including hydraulic cylinder and piston members with a first one of said members movable by fluid pressure to advance the axially movable braking surface into frictional engagement with the other surface to produce a braking force, the improvement comprising a compensating mechanism for automatically advancing the other of said hydraulic members predetermined incremental distances toward the first member in response to increased braking force to reduce the fluid requirements of said cylinder and piston according to incremental increases in said braking force, and means for returning said other member to its original position upon release of the braking force.

10. In a vehicle hydraulic brake system having one braking surface mounted for axial movement into frictional engagement with another surface to produce a braking force, the combination of an actuating means including hydraulic cylinder and piston members both mounted for axial movement, means for moving a first one of said members by fluid pressure to advance the axially movable braking surface into frictional engagement with the other surface to produce a braking force, and means responsive to said braking force for advancing the other of said members toward the first member predetermined incremenetal distances in response to increased braking force to reduce the fluid requirements of said cylinder and piston according to incremental increases in fluid pressure therein so as to compensate for increased fluid requirements in the hydraulic system, and means for returning said other member to its original position upon release of the braking force.

11. In combination, a wheeled vehicle, a brake thereon, an operator control means therefor having a predetermined force ratio and requiring a predetermined displacement ratio between the brakes and the control means for applying the brakes, said control means including a pair of members which are movable relative to one another for producing a braking force, a source of power derived from and coordinated to the momentum of the vehicle whenever the vehicle is in motion from its traction, and compensating means operatively connected to said source of power and responsive to said control means for automatically adjusting the relative positions of said members in response to increased braking force, thereby compensating for displacement losses upon movement of the control means whereby the predetermined displacement ratio cannot be exceeded, and means for returning said members to their original relative positions upon release of the braking force.

References Cited

UNITED STATES PATENTS 2,875,857 3/1959 Chapin.
2,954,673 10/1960 Oswalt __________ 188—152.13 X
2,961,831 11/1960 Brueder _________ 188—152.13 X DUANE A. REGER, *Primary Examiner.*

U.S. Cl. X.R.

188—152